United States Patent [19]

Fischbach

[11] Patent Number: 5,067,768

[45] Date of Patent: Nov. 26, 1991

[54] POWER CONVERTIBLE TOP WITH AUTOMATIC TOP AND TONNEAU SEQUENCING

[75] Inventor: Roderick C. Fischbach, Adrian, Mich.

[73] Assignee: Wickes Manufacturing Company, Southfield, Mich.

[21] Appl. No.: 425,271

[22] Filed: Oct. 23, 1989

[51] Int. Cl.[5] ............................................. B60J 7/08
[52] U.S. Cl. .................................... 296/107; 296/110; 296/117
[58] Field of Search ............... 296/117, 116, 107, 110, 296/120.1, 121

[56] References Cited

U.S. PATENT DOCUMENTS

| | | | |
|---|---|---|---|
| 2,540,454 | 2/1951 | Milhan | 296/116 |
| 2,747,928 | 5/1956 | Olivier et al. | 296/107 |
| 2,768,857 | 10/1956 | Albrecht | 296/117 |
| 3,994,524 | 11/1976 | Lehmann | 296/107 |
| 4,573,732 | 3/1986 | Muscat | 296/116 X |
| 4,741,571 | 5/1988 | Godette | 296/107 |
| 4,746,163 | 5/1988 | Muscat | 296/120 |
| 4,819,983 | 4/1989 | Alexander et al. | 296/121 |

FOREIGN PATENT DOCUMENTS 3724531  12/1988  Fed. Rep. of Germany ...... 296/117

Primary Examiner—Margaret A. Focarino
Assistant Examiner—Gary C. Hoge
Attorney, Agent, or Firm—David A. Greenlee

[57] ABSTRACT

A power actuating system automatically moves a convertible top and a tonneau in a sequence in which the tonneau is closed both when the top is raised and lowered and wherein the power actuating system includes plural power cylinders and a linkage mechanism for moving the convertible top and tonneau in a sequence including moving the tonneau from its closed position to a raised open position, thereafter moving the top from lowered position to raised position with the top rear bow partially raised, then moving the rear bow to fully raised position to provide clearance for movement of the tonneau to its closed position, moving the tonneau to its closed position, and finally moving the rear bow to its lowered position for engagement with the car body adjacent the tonneau.

11 Claims, 8 Drawing Sheets

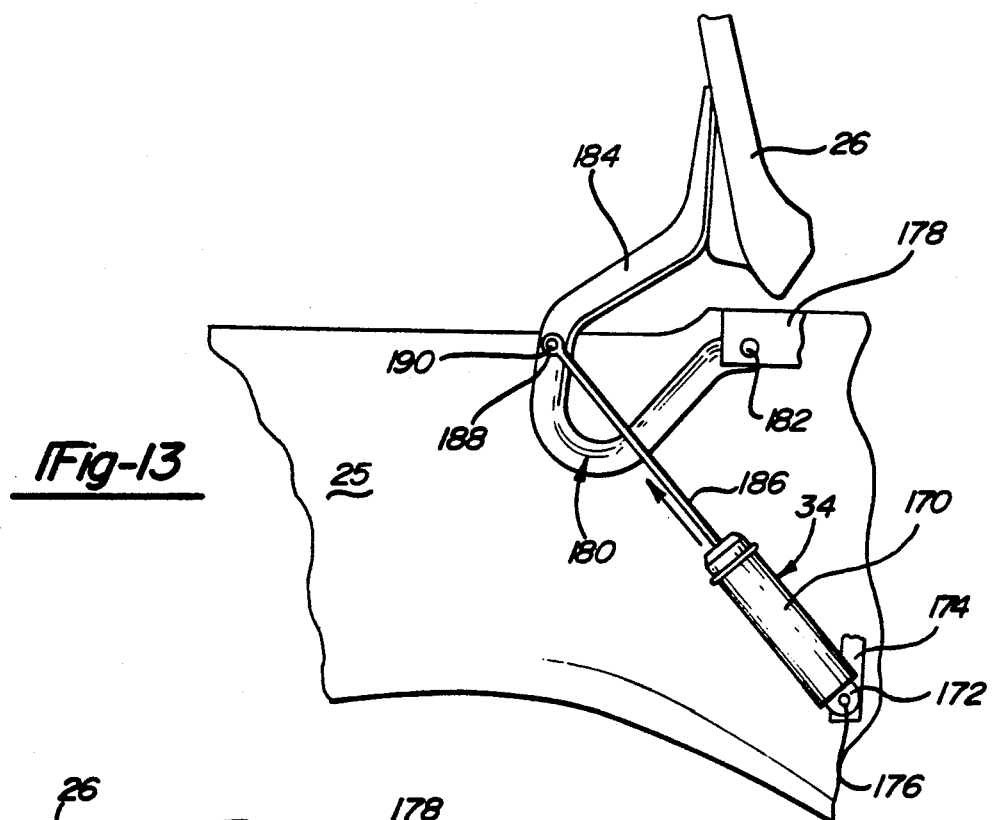
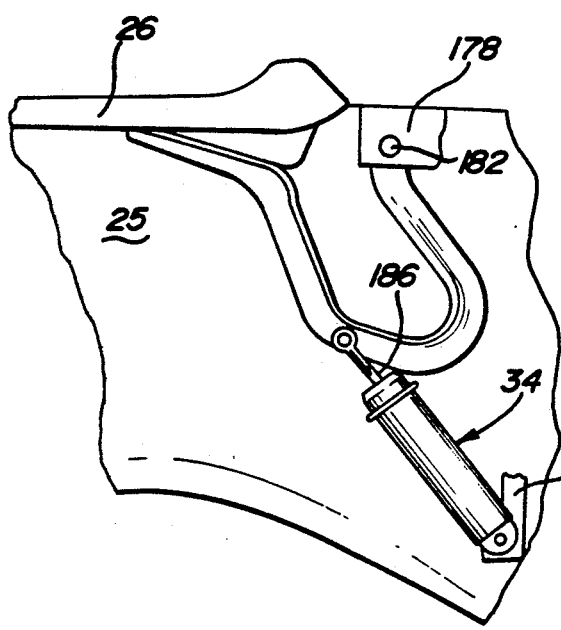
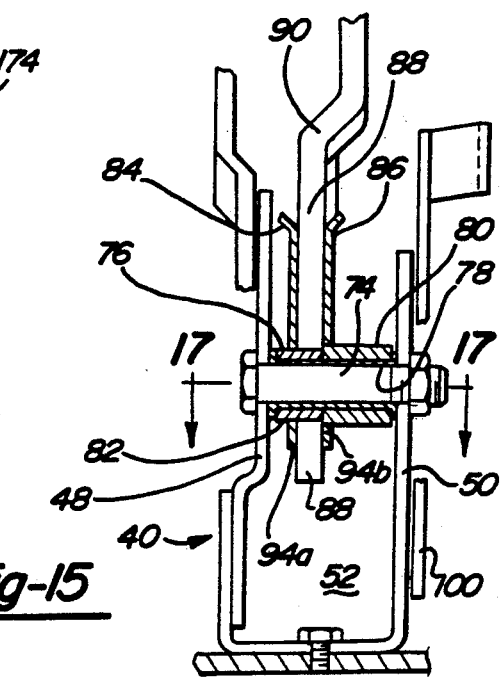

POWER CONVERTIBLE TOP WITH AUTOMATIC TOP AND TONNEAU SEQUENCING

BACKGROUND OF THE INVENTION

This invention relates to convertible tops and more particularly to convertible tops having power cylinders for automatically positioning the convertible top in raised and lowered positions with respect to a tonneau located in a closed position when the top is both raised and lowered.

U.S. Pat. No. 4,741,571 discloses a manually foldable top for automotive vehicles. The manually foldable top includes a collapsible framework supporting a foldable cover. The collapsible framework includes a front bow that is engageable with a windshield header, a rear bow that is engageable with the bottom rear edge of the fabric forming the convertible cover and a bow and linkage assembly that forms the rear portion of the roof of the convertible top. Intermediate fabric support bows are operatively connected to a linkage assembly which extends from a roof column support and linkage assembly to extend the foldable cover of the convertible top from a stowed position in a compartment aft of the passenger compartment to a top raised position in which the front bow of the convertible top is positioned in overlying relationship with the windshield header to which it is connected by means of a front linkage and securing assembly. The top is manually folded between its top raised position and a collapsed stowed position in the aft compartment. The manual operation is assisted by a self-contained spring assembly mounted on the vehicle body. The spring assembly includes a main pivot bracket mounted directly on the vehicle body and spring means which apply a force on the main pivot bracket to reduce the manual effort required to raise the top assembly to its fully raised and extended position.

While suitable for its intended purpose, the convertible top assembly of the '571 patent requires that a vehicle operator manually manipulate the convertible top to cause the linkage components thereof to either collapse or to extend, depending upon whether or not the convertible top is raised or lowered. Furthermore, the '571 patent does not provide automatic powered positioning of a tonneau in a sequence to accommodate raising and lowering of a foldable top.

An adjustable and collapsible framework for a convertible is set forth in U.S. Pat. No. 4,572,570. The framework has a rear located, pivotal vertical support column for supporting the framework of a convertible top in its raised position. It also has a bow and linkage assembly for positioning bow arches transversely over a passenger compartment to reinforce the top cover at the top edge of a rear window in the convertible top.

U.S. Pat. No. 2,540,454 discloses a collapsible convertible top having a collapsible framework with foldable side links and a plurality of intermediate cross bows, one of which is inclined rearwardly and vertically of the convertible top to support a cross bow adjacent the top of the backlite of the foldable vehicle top.

U.S. Pat. No. 3,994,524 discloses a manually actuatable top having a pair of side brackets with linkage thereof to control the position of a rear bow or fabric retaining member and a corner support and a roof column member. A main guide member pivotally supports the corner support and is connected to linkage means on a bracket mounted linkage mechanism to position foldable framework and linkage components of the top while raising the rear bow or fabric retaining member into a forwardly tilted position to provide access to a stowage compartment for a lid or tonneau. The lid or tonneau is manually opened and closed to permit the foldable top to be moved into a stowed position within a storage compartment and to be raised therefrom to cover a passenger compartment and to be latched to the header of a windshield. The cover compartment lid is manually latched in place with the cover is in its lowered position or stowed position within the storage compartment of the vehicle. There is no provision in the '524 patent for automatically operating power actuating means for sequentially moving both a convertible top and a tonneau such that the tonneau will be automatically positioned in a closed position both when the convertible top is raised and lowered.

An additional problem with prior art convertible top systems is that known power actuators only power the foldable top between its open and closed position. For example, in U.S. Pat. No. 2,540,454, a foldable vehicle top is automatically driven by a reversible electric motor located centrally of the vehicle body to operate a screw shaft threadably received by an actuating member to drive an interconnected linkage system. The linkage system includes side rails with pivotal connections that extend and retract without damaging the fabric of the top. There is no provision in the '454 patent to automatically and sequentially power both a convertible top and a tonneau such that the tonneau will be automatically positioned in a closed position both when the convertible top is raised and lowered without requiring the driver fo leave the passenger compartment.

SUMMARY OF THE INVENTION

A feature of the present invention is to automatically raise and lower a tonneau and a collapsible convertible top relative to a top storage compartment such that the tonneau is closed when the convertible top is both raised and lowered.

Another feature is to provide for such automatic operation by use of power cylinders and a hydraulic control circuit that produce a sequenced, powered movement of the tonneau and convertible top by the driver while the driver remains in the passenger compartment.

BRIEF DESCRIPTION OF THE PREFERRED EMBODIMENT

A preferred embodiment includes an actuator system for controlling the sequence of movement of the tonneau and the convertible top in which a first pair of double acting power cylinders is provided for moving the tonneau between its closed and open positions. A second pair of double acting power cylinders is connected to the rear bow to move it to a raised position in which the tonneau is free to freely move between its closed and open positions. A third pair of double acting power cylinders is connected to pivot links mounted on a pivot bracket having pivot points for the ends of three power links connected respectively to the rear bow, to the bow and linkage assembly for forming the upper rear corner of the convertible top above the backlite, and to the aft end of the link forming the last link component of a foldable framework for supporting the convertible top cover.

The operation of these three pairs of double acting power cylinders are under the control of a controller which operates electrical and hydraulic systems including a reversible motor driven pump and solenoid valves for selectively supplying power fluid to the power cylinders in a programmed sequence to operate the top and tonneau. This sequence includes moving the tonneau from its closed position to a raised open position, moving the top from its lowered position to a top fully raised position wherein the rear bow of the top is only partially raised, moving the rear bow of the top to a fully raised position to provide clearance for movement of the tonneau, moving the tonneau to its closed position through this clearance, and moving the rear bow to its lowered position for engagement with the vehicle body where it is automatically latched.

The aforesaid features and advantages of the present invention will be better understood from the following detailed description of the invention and the accompanying drawings.

DETAILED DESCRIPTION OF THE DRAWINGS

FIGS. 13 and 14 are enlarged fragmentary side elevational views, partially sectioned, of a power cylinder and associated linkage for operating a tonneau shown in open and closed positions, respectively;

FIG. 15 is an enlarged cross-sectional view taken along line 15—15 of FIG. 9, looking in the direction of the arrows;

DETAILED DESCRIPTION OF THE INVENTION

Figure 1:
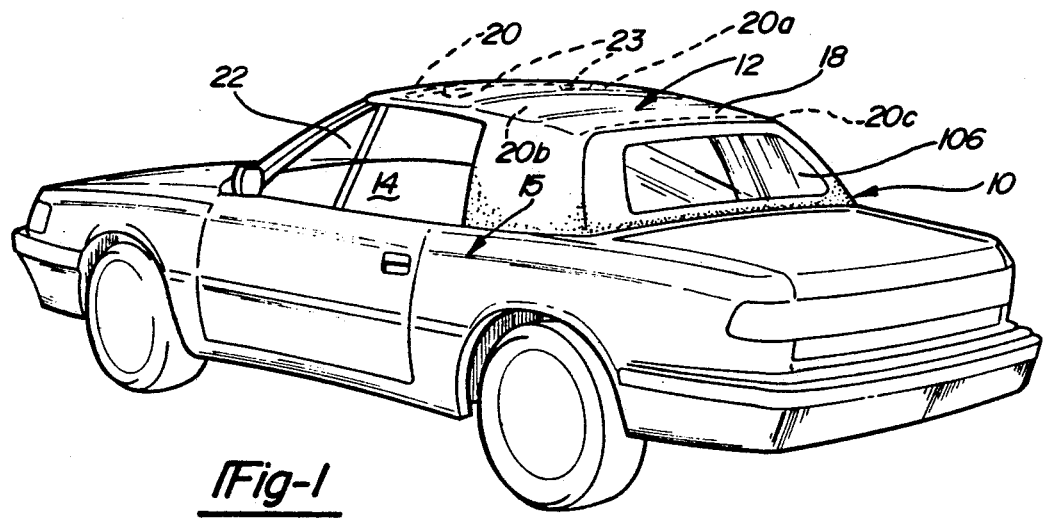
FIG. 1 is a perspective view of a passenger vehicle including the power convertible top assembly of the present invention shown in a raised position.

Referring now to FIGS. 1-6, a passenger vehicle 10 is illustrated having a power convertible top assembly 12 for opening and closing a passenger compartment 14 in the vehicle body 15. The power convertible top assembly 12 includes a foldable frame 16 having a cover 18 stretched thereover when the top is fully raised and which is gathered between bow components (to be described) of the foldable frame 16 when it is lowered.

A front bow 20 of the top assembly is engaged with a header 21 on a windshield 22 when the top is raised as shown in FIG. 1. A latch system 23 is provided to pull front bow 20 into sealing engagement with the windshield header 21. In the illustrated embodiment, the latch system 23 includes spaced threaded elements 23a on the front bow 20. The threaded elements 23a are engageable by power driven nuts 23b on the header 20 to pull down front bow 20. Intermediate bows 20a, 20b, 20c extend transversely of the cover 18 to arch it over the passenger compartment 14 when the top is raised.

A rear bow 24, shown in FIGS. 1a and 4-7, is provided at the end of the foldable frame 16 to hold the rear edge of the cover 18 in sealing engagement with vehicle body 15 when the top 12 is raised. A storage compartment 25 is located rearwardly of the passenger compartment 14 and is configured to receive the power convertible top assembly 12 when it is in the top lowered position of FIG. 2. When the top is raised, the rear bow 24 will engage the body 15 beyond the periphery of compartment 25, overlying the tonneau 26, to seal the rear edge of the cover 18.

In accordance with certain principles of the present invention, the power convertible top assembly 12 is associated with power actuating means 28 that are actuatable by the vehicle driver to automatically operate and position both the tonneau 26 and the foldable frame 16 without manual manipulation. The automatic operation is sequenced in a manner which permits the component parts of the assembly to be moved relative to one another quickly and without interference until the top is either fully raised or fully lowered with the tonneau 26 closed. The relative location of components of the power actuating system 28 is best shown in FIG. 7.

Figure 4:
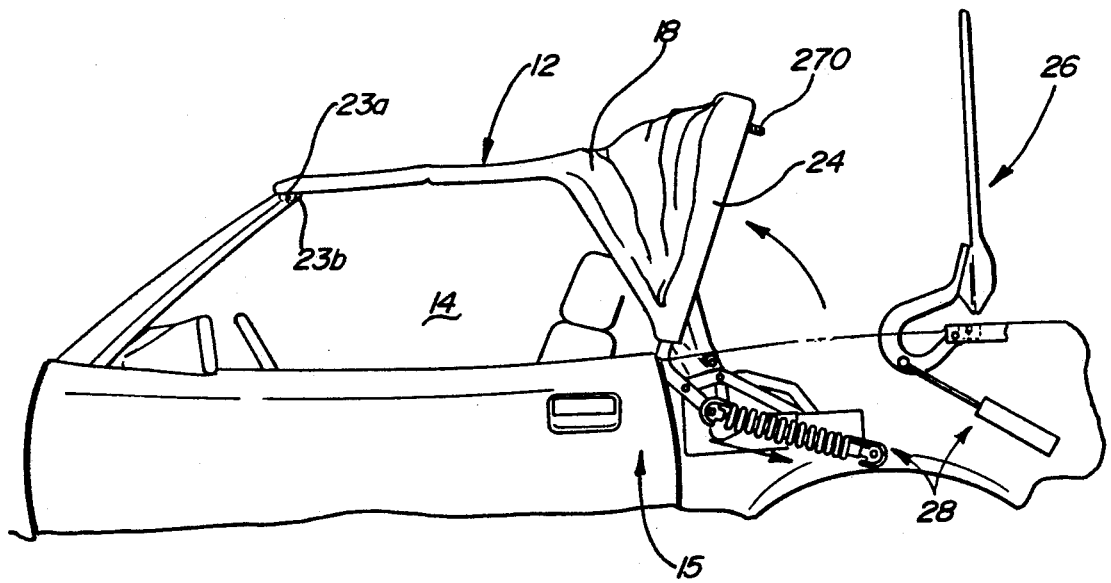
FIG. 4 is a view like FIG. 3 showing the rear bow of a foldable frame partially raised.
Figure 5:
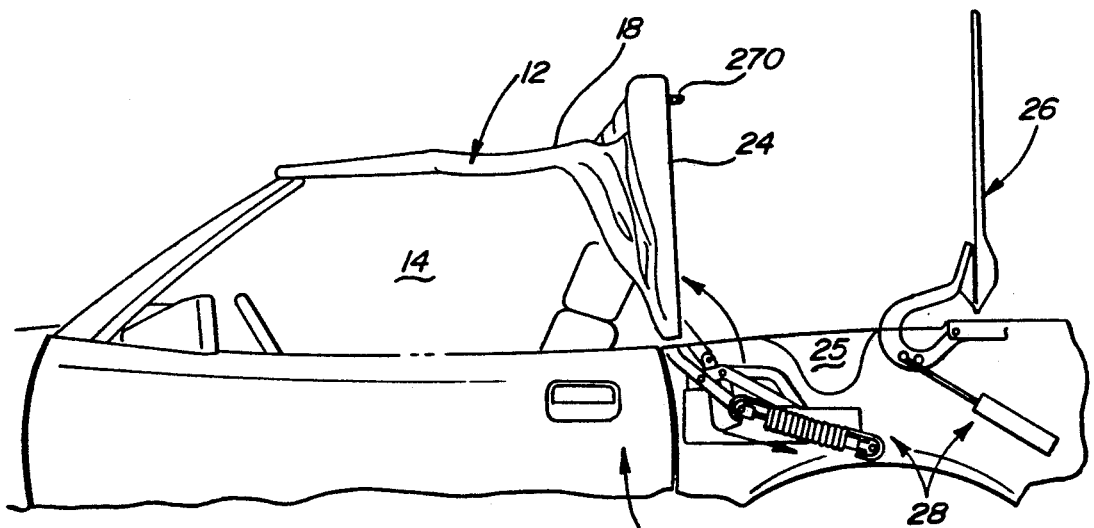
FIG. 5 is a view like FIG. 4 but with the rear bow thereof in a fully raised position to provide clearance for movement of the tonneau into a closed position when the top is in its FIG. 1 position.
Figure 6:
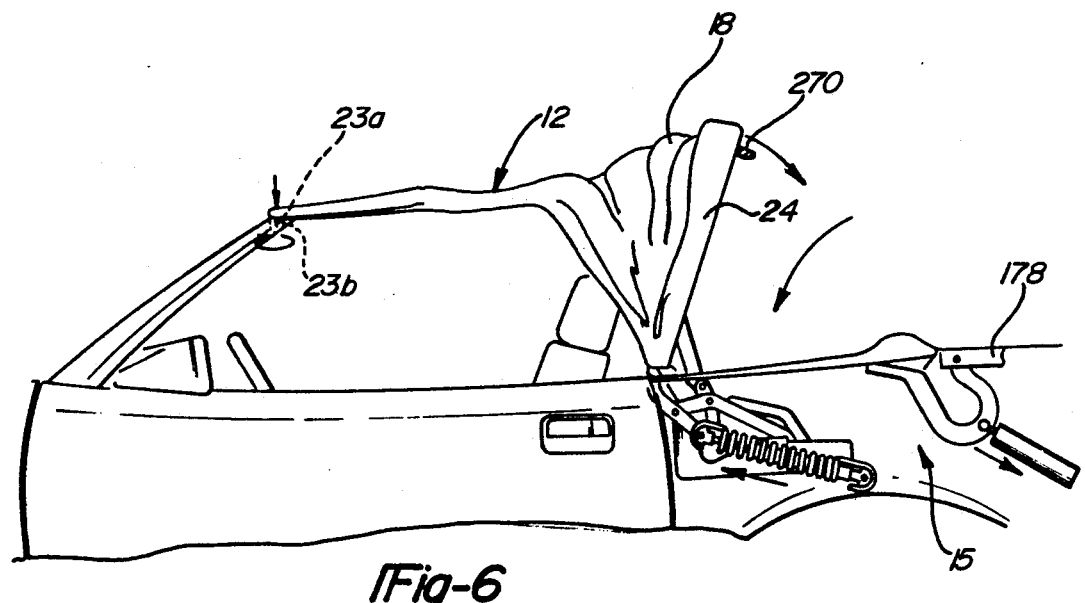
FIG. 6 is a view like FIG. 5 but with the tonneau moved from its open position toward its closed position.

The power actuating means 28 is operative through a sequence which includes first moving the tonneau 26 from closed to raised open position (FIG. 3); the top 12 is moved from its lowered position to raised position shown in FIG. 4, in which the rear bow 24 is partially raised; the rear bow 24 is moved to its fully raised position shown in FIG. 5 to provide clearance for subsequent movement of the tonneau to its closed position; the rear bow 24 is returned to its lowered position (FIG. 7) to be engaged with the body 15 so as to seal the rear end of the convertible top assembly 12.

Figure 7:
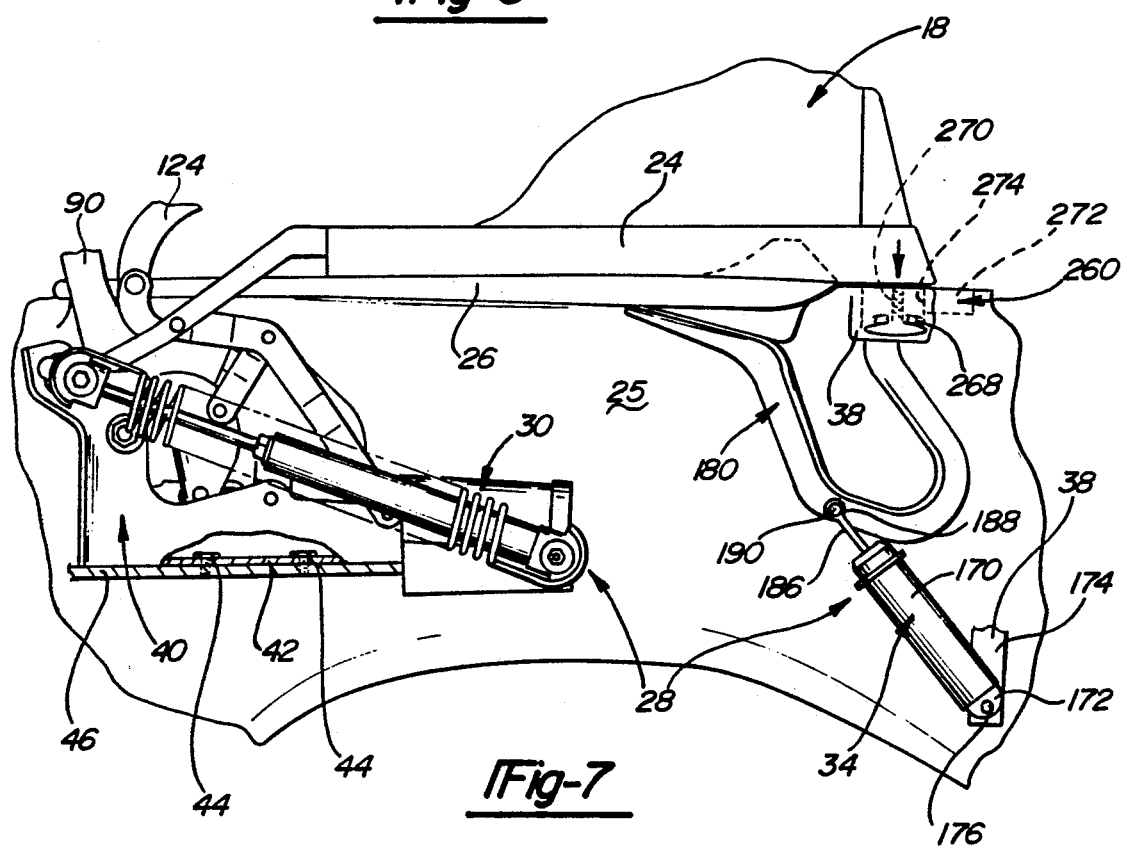
FIG. 7 is a side elevational view of a power actuating means for operating the power convertible top assembly to position the top and tonneau in the operative positions shown in FIGS. 1-6.

Referring now to FIG. 7, the power actuating means 28 is illustrated as including a pair of forward power units 30, 32 located on opposite sides of the vehicle body 15. Only one of the power units 30 is shown in FIG. 7, it being understood that the other power unit 32 is identical. Both power units 30, 32 are shown in the hydraulic circuit of FIG. 8.

The power actuating means further includes a pair of aft tonneau operating power units 34, 36 located at laterally spaced points on a body frame structure 38 located rearwardly of top storage compartment 25. Only one of the power units 34 is shown in FIG. 7, it being understood that the other power unit 36 is identical. Both units 34, 36 are shown in the hydraulic circuit of FIG. 8. For purposes of reference, the components of the power actuating means described below are viewed from the outside of the vehicle looking at the driver's left side of the vehicle.

Each of the top operating power units 30, 32, and tonneau operating units 34, 36 are representatively shown as double acting hydraulic cylinders, it being understood that other double acting actuators such as pneumatic or ball screw actuators can be used.

Figure 9:
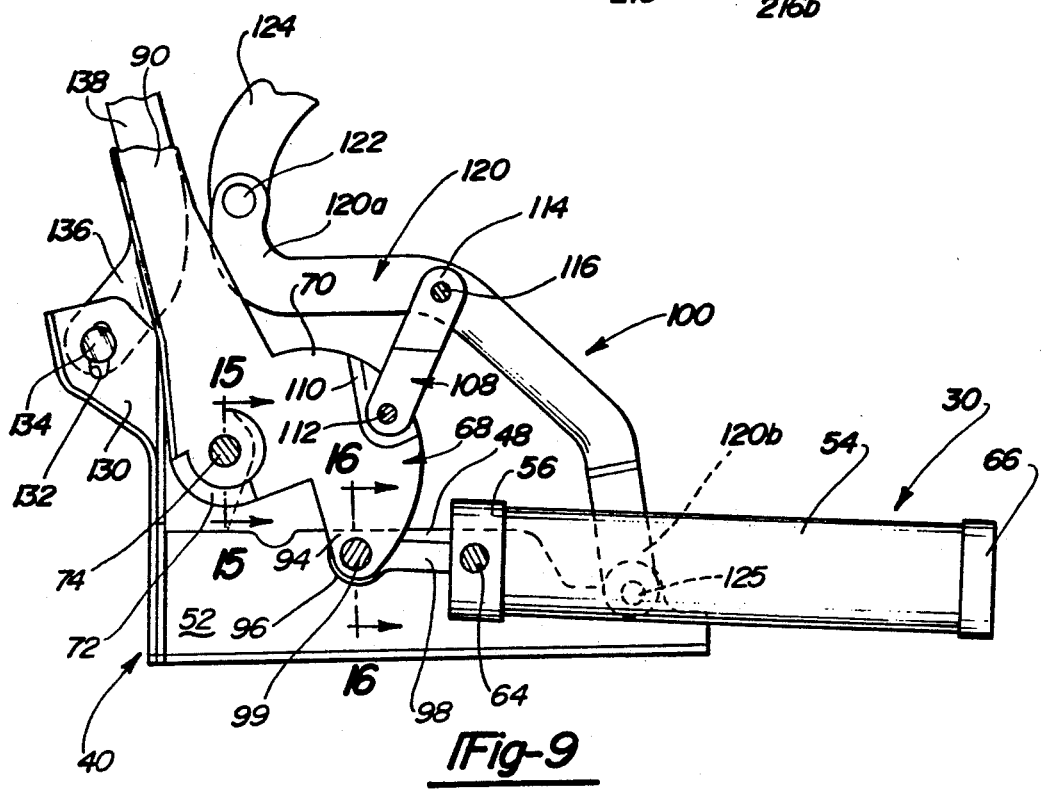
FIGS. 9 and 10 are enlarged fragmentary side elevational views, partially sectioned, of a power cylinder and associated linkage for operating foldable top linkage and showing the power cylinder and its associated linkage in top raised and top lowered positions, respectively.
Figure 17:
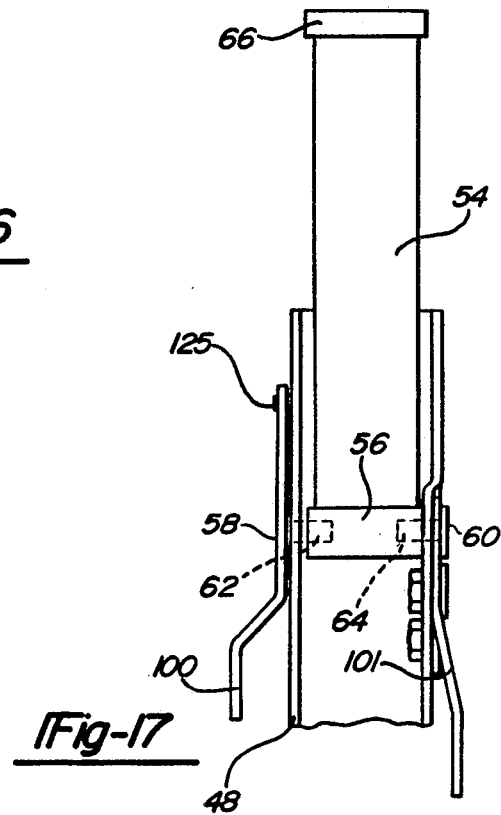
FIG. 17 is a sectional view taken along line 17—17 of FIG. 15, looking in the direction of the arrows.

The top operating power units 30, 32 are each associated with a side mounted linkage for raising and lowering the top. Since the linkages and power units are the same, only power unit 30 and the linkage associated with it is shown and will be described. The linkage includes a bracket assembly 40 having a base 42 thereon connected by fasteners 44 to a vehicle body portion 46. As shown in FIGS. 9 and 15, spaced walls 48, 50 of the bracket assembly 40 define a cavity 52 for power unit 30. Power unit 30 includes a cylinder 54 having a cylinder cap 56 which is pivotally secured to spaced pivot points 58, 60 on the walls 48, 50 by pivot pins 62, 64, respectively, as best seen in FIGS. 9 and 17. Power unit 30 is supported to allow its rear cylinder head 66 to move freely vertically within cavity 52 as power unit 30 moves crank element 68 to operate the foldable frame 16.

The crank element 68 forms the lower portion of a power link 90 and is supported within cavity 52 at a point located forwardly of the power cylinder 54, as best shown in FIGS. 9 and 15. The crank element 68 has a curvilinear segment 70 adjacent a first end 72 which is connected by a pivot bolt 74 to the spaced walls 48, 50, as best seen in FIG. 15. The pivot bolt 74 journals bearing members 76, 78 which support spacers 80, 82 for positioning side wall segments 84, 86 of the crank 68. The wall segments 84, 86 embrace the end 88 of power link 90 for actuating a balance linkage assembly 92 (FIG. 18) to be described.

The power crank 68 includes a second end 94 defined by spaced end segments 94a and 94b of the side walls 86 and 88, respectively. The end segments 94a, 94b capture an eyelet 96 formed on the end of a piston rod 98 extending from cylinder 54 of the power unit 30. A pivot pin 99 extends through the end segments 94a, 94b and the eyelet 96 to pivotally secure the piston rod 98 to the crank 68.

A reinforcement plate 101 is secured to the bracket wall 50 adjacent cylinder cap 56 of the top operating power unit 30 to distribute the load from the main power link 90.

Figure 1A:
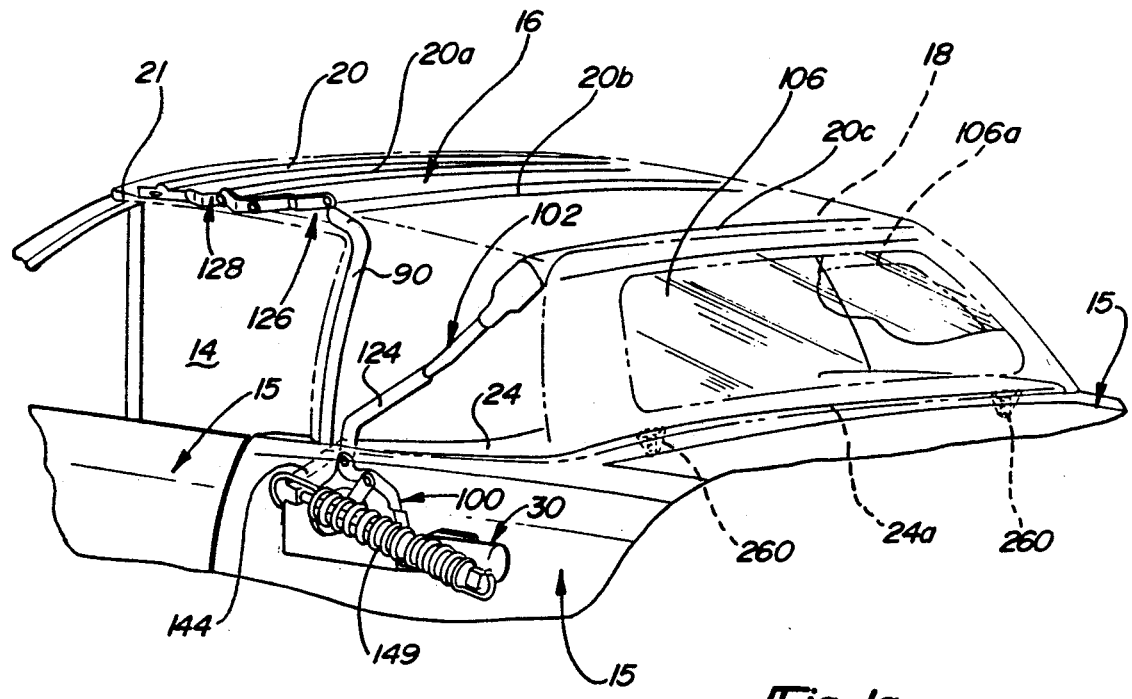
FIG. 1a is an enlarged fragmentary perspective view of a foldable frame for the convertible top of FIG. 1.

The crank 68 is also connected to a linkage 100 for operating a bow and linkage assembly 102 shown in FIG. 1a. It includes an intermediate bow 20c which extends transversely of cover 18 to form the upper rear corner of the convertible top 12 at a point above a backlite 106 when it is raised, as best shown in FIG. 1.

FIG. 9 shows that linkage 100 includes a transfer link 108 having one end pivoted to an offset 110 in the crank 68 by a pivot pin 112. Link 108 is connected at its opposite end 114 by a pivot pin 116 to an offset end 118 of a power link 120. The power link 120 has an upper curved end 120a connected by a pivot pin 122 to the end of a rearwardly and vertically extending arm 124 that is connected to the cross bow 20c as shown in FIG. 1a. The opposite lower end 120b of the power link 120 is pivotally connected by a pivot pin 125 to the base 42 of the bracket assembly 40.

Figure 10:
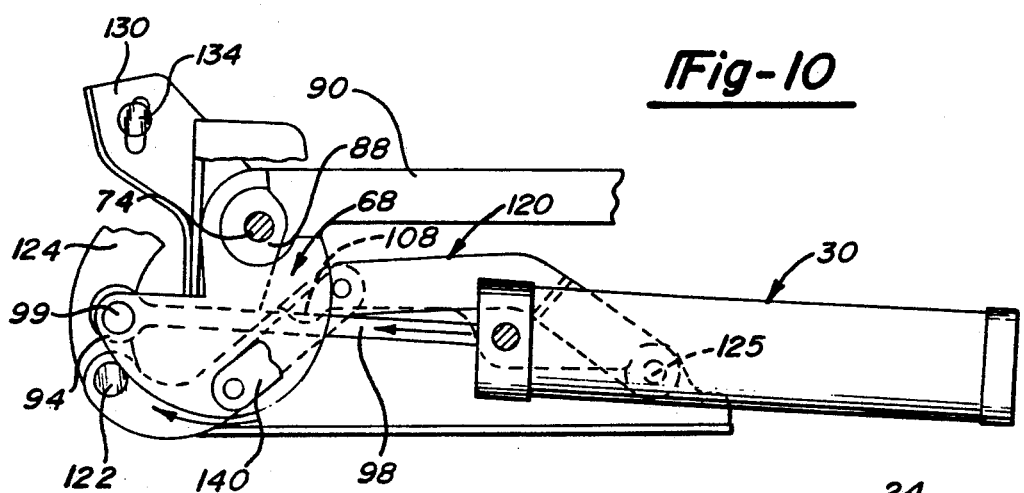

The power link 120 is configured to guide the bow and linkage assembly 102 from the top raised position shown in FIG. 9 to the top lowered position shown in FIG. 10.

Figure 18:
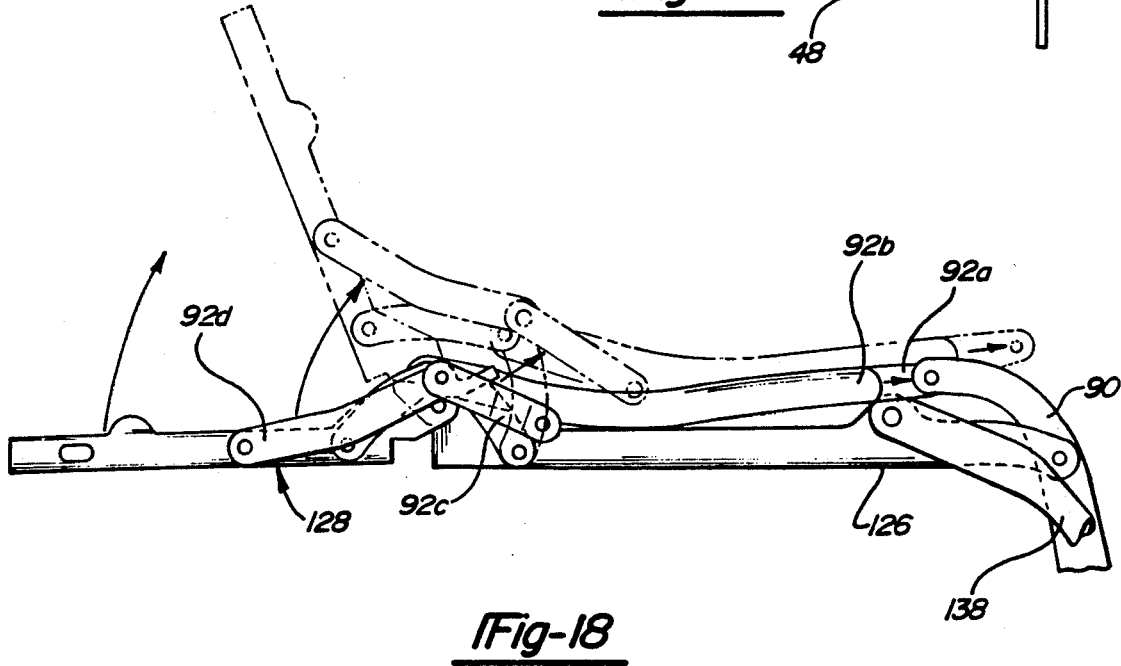
FIG. 18 is a fragmentary side elevational view of side linkage of the foldable top frame shown in extended position in solid lines and in partially collapsed position in phantom lines.

The power link 90 connected to the balance linkage assembly 92 (FIG. 18) is rotated upwardly (counterclockwise) from the top lowered position of FIG. 10 by the crank 68 to the top raised position shown in FIG. 9. This extends balance linkage assembly 92 to position side link components 126, 128 of foldable frame 16 into a longitudinally extended relationship (FIGS. 1a and 18). This action positions front bow 20 adjacent header 21 so that screw elements 23a engage power driven nuts 23b to seal front bow 20 to header 21.

As shown in FIG. 9, bracket 40 includes a forwardly located upper segment 130 which has a lost motion slot 132 that receives a pin 134 mounted on a curved end 136 of link 90 at the aft end of the side link components 126, 128. This arrangement provides slack adjustment of the side link components 126, 128 by the components 92a-92d of the balance linkage assembly as shown in FIG. 18.

Figure 11:
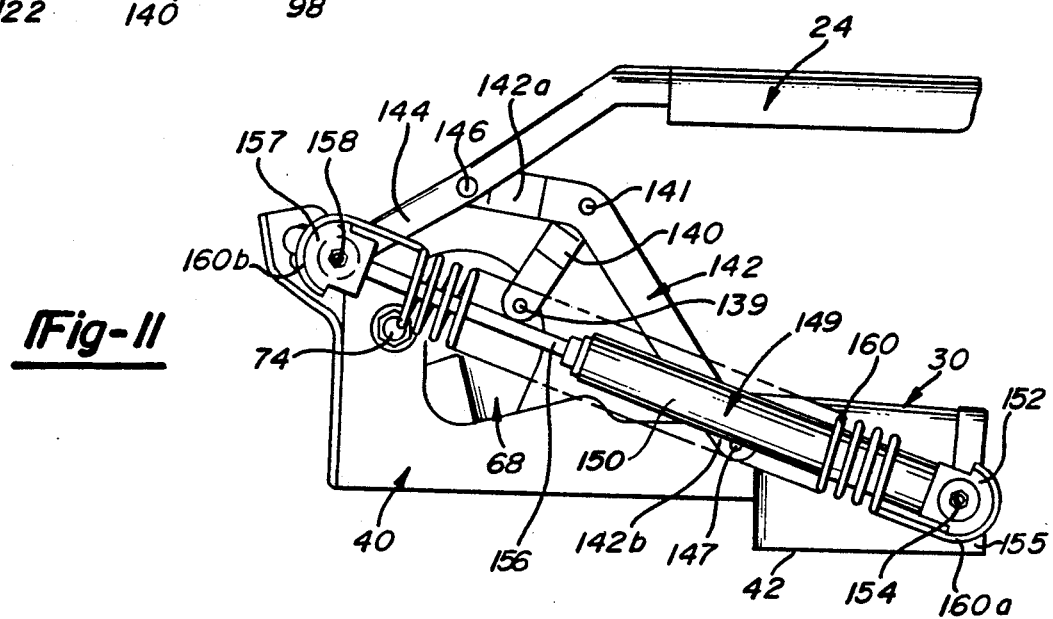
FIGS. 11 and 12 are enlarged fragmentary side elevational views, partially sectioned, of a power cylinder and associated linkage for operating a rear bow component of the foldable top linkage in top raised and top lowered/stowed positions, respectively.
Figure 12:
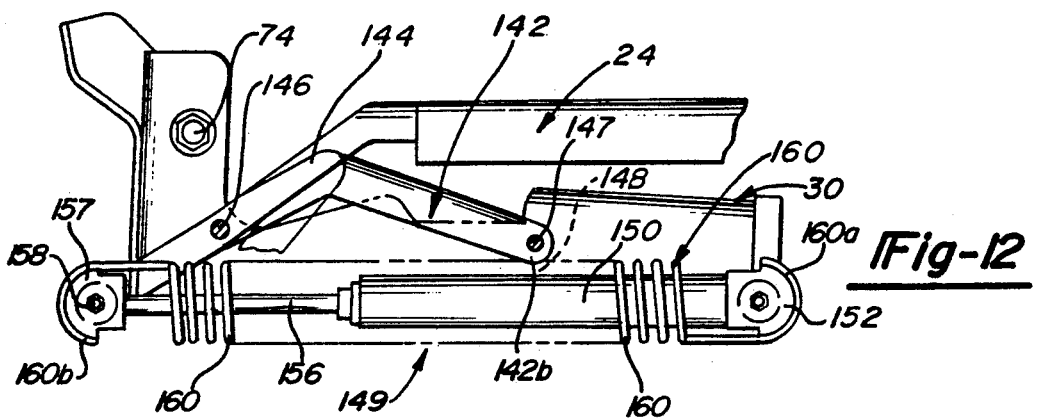
Figure 16:
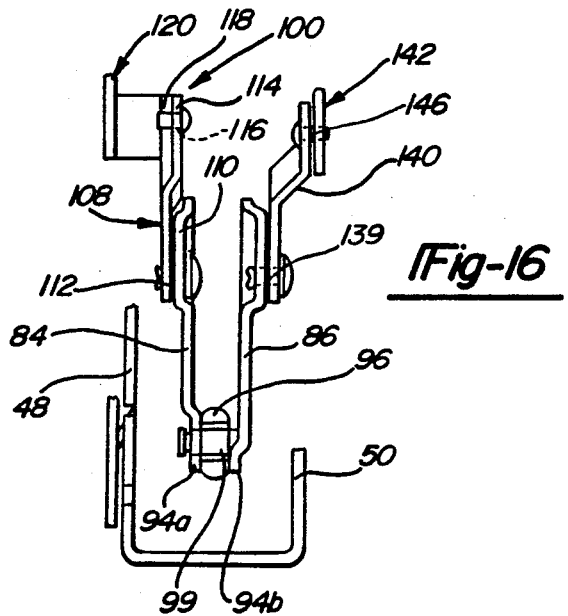
FIG. 16 is an enlarged cross-sectional view taken along line 16—16 of FIG. 9, looking in the direction of the arrows.

As best shown in FIGS. 11, 12, and 16, wall 86 of power crank 68 is also connected by pivot pin 139 to a guide link 140. A pivot pin 141 connects link 140 to a power link 142. Power link 142 is configured to control the movement of a lever arm 144 that is connected to one end of the rear bow 24. Lever arm 144 is secured by a pivot pin 146 to the upper end 142a of the guide link 142. The lower end 142b of the guide link 142 is pivotally connected by a pin 147 to the segment 148 of bracket 40 slightly rearwardly of pivot pin 125.

The power for lifting the rear bow 24 is provided by a pair of power units 149, 151, only one of which 149 is shown in FIGS. 1a, 11 and 12. Each power unit 149, 151 includes power cylinder 150 located outboard of the outer bracket wall 48. Cylinder 150 has a head end mounting bracket 152 that is pivoted by pin 154 to an aft segment 155 of base 42. Cylinder 150 includes a piston rod 156 having a rod end mounting bracket 157 which is pivoted by pin 158 to the distal end of the lever 144 so that movement of piston rod 156 pivots lever arm 144 about its pivotal connection 146 to power link 142.

A spring 160 surrounds power cylinder 150 and the piston rod 156. Spring rear end 160a is secured to end mounting bracket 152, while the other end 160b is secured to end mounting bracket 157.

The spring 160 is in tension and supplies a force on the lever 144 that will assist cylinder 150 in raising the rear bow 24 to its vertical position shown in FIG. 5 during a sequence of operation of the power convertible top assembly 12. The force of spring 160 alone is sufficient to maintain the rear bow 24 in its FIG. 4 partially raised position when power cylinder 150 is depressurized, as will be described later.

Retraction of piston rod 156 into power cylinder 150 pivots lever arm 144 counterclockwise (FIGS. 11 and 12) about pin 146 to raise the rear bow 24. At this point, the guide link 140 is operative to assume the position in FIG. 5 to guide the rear bow 24 into its vertically raised position.

Movement of tonneau 26 between raised and lowered positions will now be described with reference to FIGS. 13 and 14. The power actuating means 28 further includes a pair of identical aft located power units 34, 36, only one of which 34 is shown in FIGS. 13 and 14. Power unit 34 includes a hydraulic cylinder 170 having a lower head end mount 172 connected to the lower end of a vertical frame portion 174 of frame 38 by a pivot pin 176 (FIG. 7). Frame 38 includes a deck portion 178 rearwardly of storage compartment 25. A J link 180 is pivotally secured to the deck 178 by a pivot pin 182. The opposite end 184 of the J link rigidly mounts tonneau 26. Cylinder 170 includes a piston rod 186 having an eyelet 188 pivoted by a pin 190 to an intermediate portion of J link 180.

The power actuating means 28 described above is with reference to the forward and aft power units 30 and 34 located on the left or driver's side of the passenger vehicle 10. It should be understood that the forward and the aft power units 32 and 36 on the right side of the vehicle are identical to those described above. The power units 30, 32 and power units 34, 36 are located opposite one another and connected to the vehicle body by suitable fastener means so that the power convertible top assembly 12 can be assembled as a unit to a vehicle body with all the operative links, cranks, etc., thereof being connected to the respective power units 30, 32, 34, 36, 150 described above.

Figure 8:
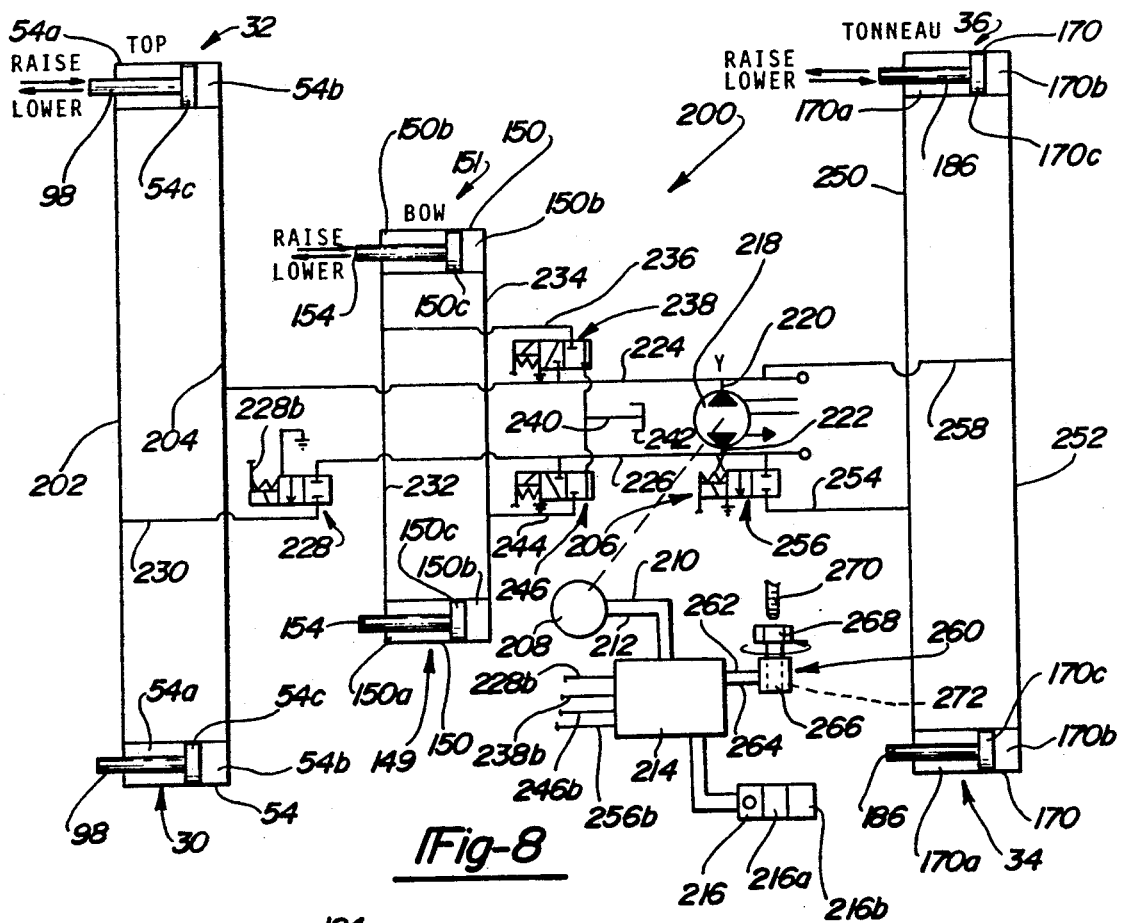
FIG. 8 is a diagrammatic view of a hydraulic control circuit for supplying pressurized fluid to the actuating means of FIG. 7.

Referring now to FIG. 8, a fluid power circuit 200 includes the pairs of operating power units 30 and 32, 34 and 36, 149 and 151 described above. The cylinders 54 of power units 30 and 32 have rod-end and head-end fluid chambers 54a and 54b separated by a piston 54c which retracts and extends piston rod 98 relative to cylinder 54 to raise and lower top 12 as described above when chambers 54a, 54b are alternately pressurized. A fluid conduit 202 interconnects rod-end chambers 54a, while a fluid conduit 204 interconnects head-end chambers 54b.

The fluid supply circuit 200 is supplied with pressurized hydraulic fluid by a pressure source 206 which is diagrammatically illustrated in FIG. 8. Source 206 includes a reversible electric motor 208 having lead wires 210, 212 connected to a controller 214 which is sequenced by a control switch 216 operable to sequence operation of the power convertible top assembly 12 shown in FIGS 1-6 and previously described. Control switch 216 is in series with an enabling switch 216a and a latch release switch 216b, as will be later described.

Motor 208 drives a hydraulic pump 218 in alternate directions to alternately pressurize fluid ports 220, 222. Port 220 connects to cylinder chambers 54b through conduits 224 and 204. Port 222 connects to cylinder chambers 54a via a conduit 226, a two-way, normally closed solenoid valve 228 and conduit 230 and 202.

The power cylinders 150 are each divided into chambers 150a and 150b by a piston 150c. Alternate pressurization of chambers 150a and 150b will reciprocate piston rod 154 relative to cylinder 150 to raise and lower rear bow 24 in accordance with my invention.

The rod-end chambers 150a are interconnected by a conduit 232 and the head-end chambers 150b are interconnected by a conduit 234. Conduit 232 connects via conduit 236 to a three-way, normally closed solenoid valve 238. Valve 238 is operable to connect conduit 236 to supply line 224 or to a return conduit 240 connected to a hydraulic reservoir 242. Likewise, conduit 234 is connectable by a conduit 244 through a three-way, normally closed solenoid valve 246 to either return conduit 240, and thence to the reservoir 242, or to supply line 226.

Tonneau operating power units 34 and 36 each comprise a cylinder 170 that is divided into fluid chambers 170a and 170b by an operating piston 170c. Chambers 170a and 170b are alternately pressurizable to reciprocate piston 170c to extend and retract attached piston rod 186 relative to cylinders 170 to lower and raise tonneau 26 as described above. The chambers 170a are interconnected by a fluid conduit 250 which connects through a line 254 to a solenoid valve 256. Valve 256 is operable to connect line 254 to either supply line 254 or to reservoir. Chambers 170b are interconnected by a conduit 252 which connects to supply line 224 via a conduit 258.

A motor driven pull-down actuator 260 is diagrammatically shown in FIG. 8. Actuator 260 is electrically connected by lines 262, 264 to the controller 214 which may be operated to drive a reversible motor 266. Two actuators 260 are provided, one on either side of the deck 178, as shown in FIGS. 1a and 7. These actuators can be of any of the conventional types currently in use as trunk lid pull-down devices. The actuators shown are for illustrative purposes only.

Each motor 266 drives a rotatable nut 268 the engages a threaded stud 270 mounted on rear bow 24 to pull it down into sealing engagement with the vehicle body in the top raised position of FIGS. 1 and 1a.

A limit switch 272 is provided for each pull-down actuator to control power to the motor 266. Limit switch 272 is positioned on the body 15 (see FIG. 3) so that it will be engaged by rear bow 24 to active motor 266 so that nut 268 will capture threaded stud 270 as rear bow 24 is lowered in top raised position. Reverse actuation of motors 266 will expel stud 270 from nut 268 as rear bow 24 is raised to disengage a limit switch 272 to deactivate motor 266. Of course, other types of pull-down devices currently on the market could alternatively be used.

SYSTEM OPERATION

Figure 2:
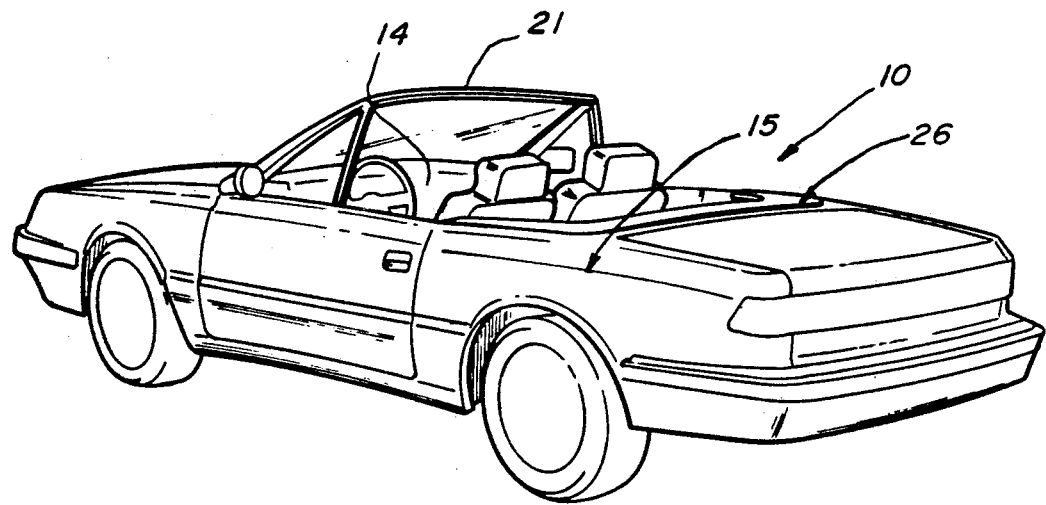
FIG. 2 is a view like FIG. 1 showing the convertible top assembly in a lowered position to completely open a passenger compartment of the vehicle.
Figure 3:
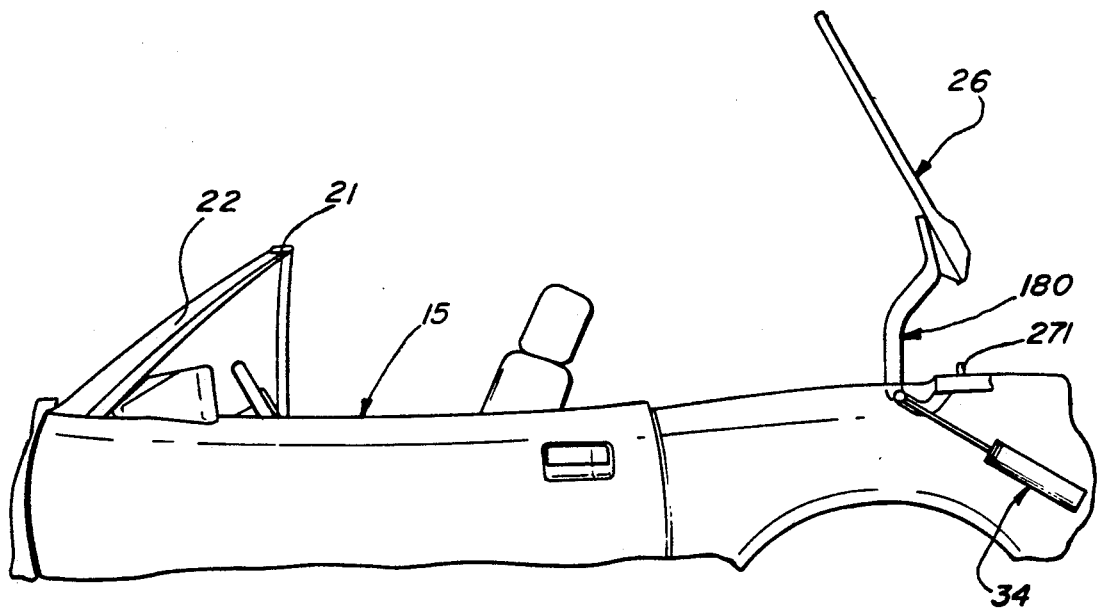
FIG. 3 is a partial side view of a vehicle showing a tonneau of the power convertible top assembly in raised position prior to deployment of a foldable frame for the top cover.

The operating sequence of the present invention is described below, starting from a top raised position of FIG. 1 and proceeding to the top lowered position of FIG. 2.

The automatic operation of convertible top assembly 12 is controlled by master switch 216. Operation is initiated by placing the vehicle transmission in a park or neutral position to close the enabling switch 216a. Alternatively, the enabling switch 216a could be controlled by a speed sensor to close when the vehicle is at a speed equal to or less than three miles per hour.

Latch release switch 216b is closed when header latch 23 is unlatched to release front bow 23 from the windshield header 21.

The controller 214 is electrically connected via lines 228b, 238b, 246b and 256b to respective solenoid control valves 228, 238, 246 and 256 to control the flow of hydraulic pressure fluid as described below. After switches 216a and 216b are closed by parking the vehicle and unlatching the front bow, operation of switch 216 activates motors 266 in a direction to expel studs 270 from nuts 268. This frees rear bow 24 from vehicle body 15 for subsequent movement. Next, pump unit 218 is driven in a direction to pressurize hydraulic supply line 224. This makes pump port 220 the high pressure outlet and port 222 the low pressure inlet. Next, solenoid is shifted to supply connect line 224 to conduits 236 and 232 and pressurize chambers 150a. Simultaneously, solenoid valve 246 is operated to connect chambers 150b to reservoir 242 through lines 234, 244. This retracts the piston rods 156 within power cylinders 150 to pivot lever 144 about pivot 146 to raise rear bow 24 from its horizontal FIG. 11 position to the vertical position of FIG. 5. Disengagement of rear bow 24 from limit switches 272 will stop motors 266.

Although pressurization of conduit 224 instantly pressurizes chambers 54b of the top power cylinders 54, pistons 54c are held immobile because fluid is trapped in chambers 54a by solenoid valve 228 which is closed. Similarly, chambers 170b of tonneau power cylinders 170 are pressurized, but pistons 170c are held immobile because hydraulic fluid is trapped in chambers 170a by solenoid valve 256.

When rear bow 24 reaches its vertical FIG. 5 position, it is held in this position by continued pressurization of chambers 150a.

Next, solenoid 256 is actuated to connect chambers 170a to reservoir via conduits 250 and 254. This allows movement of pistons 170c to extend piston rods 186 from cylinders 170 to move tonneau 26 from its closed FIGS. 6 and 14 position to its open position shown in FIGS. 5 and 13, where it is held by continued pressurization of chambers 170b by supply line 224.

Next, solenoid 238 is operated to connect rear bow cylinder chambers 150a to reservoir, thus depressurizing cylinders 15. This allows rear bow 24 to "float", as shown in FIG. 4, under the bias of springs 160.

Next, solenoid valve 228 is actuated to connect chambers 54a to reservoir via conduits 202 and 230. Consequently, pistons 54c can now move and piston rods 98 will extend from cylinders 54 to rotate power crank 68 clockwise about the pivot 74, from the FIG. 9 position to the FIG. 10 position. This action rotates power link 90 to move linkage 92 from the solid line position of FIG. 18 to the phantom line position. This collapses the side link components 126, 128 and folds the cover 18 onto the folding frame 16 which is drawn rearwardly and downwardly into the storage compartment 25.

Once the top is fully stowed within compartment 25, controller 214 reverses motor 208 and pump 218 to pressurize fluid supply conduit 226 via pump port 222 which now becomes the pump outlet, while port 220 becomes the low pressure inlet. Solenoid valve 256 is shifted to connect line 254 with supply conduit 226 to pressurize chambers 170a of cylinders 170 and retract the piston rods 188 into cylinders 170. This pivots J links 180 counterclockwise to close tonneau 26 over the stowed top, where it is conventionally latched. Consequently, top storage compartment 25 is closed and passenger compartment 14 is fully opened, as shown in FIG. 2. Power actuators 30 and 151 and their associated linkages are now in the positions shown in FIGS. 10 and 12.

When it is desired to raise convertible top assembly 12 from its stowed position within the compartment 25, switch 216b must be closed by placing the car transmission in park or neutral or using a speed sensor. Switch 216a has remained closed ever since latch 23 was opened to lower the top. Closing of switch 216 causes the controller 214 to release the conventional tonneau latch (not shown) and energize motor 208 to actuate pump 218 to pressurize fluid outlet port 220 and conduits 224, 258 to pressurize chambers 170b and cause power cylinders 170a to raise the tonneau to the open position of FIGS. 3 and 13.

The top 12 and the foldable frame 16 are then raised into a one-half up position shown in FIG. 4 by reserving pump 218 to pressurize supply conduit 226 and actuating solenoid valve 228 to pressurize conduits 230, 202 and chambers 54a of the cylinders 54. This retracts piston rods 98 within cylinders 54 to pivot the power crank 68 counter-clockwise FIG. 9) and raise power link 90 from its stowed position.

This causes linkage 92 to extend through the phantom line position of FIG. 18 to the solid line position. As front bow 20 engages windshield header 21, latch screw members 23a engage power driven nuts 23b to pull the front bow 20 into sealing engagement with header 21 in much the same manner of operation as rear bow pull down actuators 260, described above. Controller 214 now closes solenoid valve 228 and actuates solenoid valve 238 to connect conduits 224 and 236, and actuate solenoid valve 246 to connect conduit 234 to reservoir.

Next, rear bow cylinders 149 and 151 are pressurized by again reversing the pump 218 and pressurizing outlet port 220, supply conduit 224, conduits 236, 232 and chambers 150a of the cylinders 149a, 151. This retracts piston rods 154 within cylinders 149, 151 to raise the rear bow fully to the FIG. 5 position. Controller 214 now actuates solenoids to close, thus isolating chambers 150a and locking rear bow 24 in its raised position. This action provides a clearance path for subsequent movement of the tonneau 26.

Next, controller 214 actuates solenoid valve 256 to connect conduits 226 and 254 and simultaneously reverses pump 218 to pressurize fluid outlet 222 and supply conduit 226 to pressurize chambers 170a via lines 254 and 250. This retracts piston rods 186 within cylinders 170 to lower tonneau 26 to a closed position where it is latched.

Next, solenoid valve 246 is activated to connect lines 224 and 226, while solenoid valve 238 is activated to connect line 236 with reservoir. Pump 218 is operated to pressurize port 222 and supply line 226 to pressurize chambers 150b of rear bow operating cylinders 150, conduits 226, 244 and 234. Consequently, the piston rods 154 will extend from the cylinders 150 to lower rear bow 24 over the closed tonneau 26, as shown in FIG. 7. As rear bow 24 engages the body 15 adjacent tonneau 26, threaded studs 270 are captured by power nuts 268 of the actuators 260 and pulled down with rear bow 24 in sealing engagement with body 15, as shown in FIGS. 1, 1a, 7 and 11. It will be appreciated that movement of crank 68 positions the rear bow pivot fulcrum 146 forwardly to enable the rear bow to clear the perimeter of the storage compartment 25 when the top is lowered (see FIG. 12). In top raised position, however (see FIG. 11), pivot 146 is moved up and rearward to enable rear bow to overlie the perimeter of compartment 25 as shown in FIG. 7. Next, motor 208 and pump 218 are deactivated.

The aforedescribed controller enables a vehicle occupant to either raise or lower the power convertible top assembly without leaving the passenger compartment and without manual manipulation of either the tonneau or the foldable sections of the cover and their associated linkage. Consequently, the top may be easily positioned either to cover or open the passenger compartment, as desired.

Various modifications can be made with respect to the disclosed embodiment without departing from the scope of the invention as claimed in the following claims.

What is claimed is:

1. A power convertible assembly for a passenger vehicle having a body, a passenger compartment in the body, a windshield having a header, a convertible top movable between raised and lowered positions to cover and uncover the passenger compartment, a storage compartment within the body for receiving the top in its lowered position, a tonneau movable between closed and open positions with respect to the body to open and close a path for movement of the top between its raised and lowered positions, the tonneau being in its closed position in both the raised and lowered top positions; and wherein the top has a foldable cover and a collapsible framework for the cover including a front bow engageable with the header, and a rear bow movable between raised and lowered positions and engageable with the vehicle body in the top raised position, and latch means on the body and the rear bow for latching the rear bow to the body, characterized by; power actuating means for automatically moving the top and tonneau in a stepped sequence from a top lowered position, to a top raised position the sequence including moving the tonneau from its closed position to a raised open position, thereafter moving the top from its lowered position to a raised position wherein the rear bow of the top is partially raised, then moving the rear bow of the top to its fully raised position to provide clearance for return movement of the tonneau to its closed position, moving the tonneau to its closed position through the clearance provided by the fully raised rear bow and finally moving the rear bow to its lowered position in engagement with the vehicle body.

2. In the power convertible assembly of claim 1, first, second and third pairs of power units and means for selectively directing power to and from said first, second and third pairs of power units to produce the stepped sequence for automatically moving the top and tonneau from a top lowered position to a top raised position.

3. In the power convertible assembly of claim 2, said power actuating means including means for operating one pair of said first, second and third pairs of power units to raise the rear bow to provide a path for movement of said tonneau between its open and closed positions when the top is moved to its raised position; and means for conditioning said power actuating means to move the tonneau only following movement of the rear bow to its raised position.

4. In the power convertible assembly of claim 3, a reversible motor pump and solenoid valve means energized selectively to direct pressurized fluid to said one pair of power units to move the tonneau to its raised position and to move the tonneau to its lowered position.

5. In the power convertible assembly of claim 1, first, second and third pairs of double acting power cylinders; each of said first pair of double acting power cylinders having a cylinder and a piston rod; said cylinder pivotally connected to the vehicle body; said piston rod extending from said power cylinder and means for pivotally connecting said piston rod to the rear bow for moving said rear bow between its raised and lowered positions; and means including a crank and said second pair of double acting power cylinders for moving the top to and from a stowed position within the storage compartment; and linkage means coupled to the rear bow and to said crank to guide movement of the rear bow into its raised position following partial raising and lowering of the top to and from its stowed position within the storage compartment.

6. In the power convertible top assembly of claim 5, means including a third pair of double acting power cylinders for moving the tonneau into a closed position to cover the top when stowed within the storage compartments; and means including a reversible motor driven pump means and solenoid valve means energized to selectively direct pressurized fluid flow to said third pair of double acting power cylinders to raise the tonneau to its raised position and to maintain it in the raised position as said second pair of double acting power cylinders partially opens the top and as said first pair of double acting power cylinders positions the rear bow in its raised position.

7. In the power convertible top assembly of claim 5, said crank means including a pair of crank members each having opposite ends thereon pivotally connected respectively to the vehicle body and to the piston rods of said second pair of double acting power cylinders and each including a pivot point thereon; guide linkage means for connecting said pivot point to said rear bow at a point thereon spaced from the connection of said rear bow to said first pair of double acting power cylinder means to a guide vertical movement of the rear bow with respect to the vehicle body as the piston rods of said first pair of double acting power cylinder means are retracted into their respective cylinders.

8. In the power convertible assembly of claim 7, said guide linkage means including a first link having opposite ends thereon; a second link longer than said first link having an intermediate point and opposite ends, one such opposite end pivotally connected with respect to the vehicle body and having the other opposite end located vertically above the one end and pivotally connected to the rear bow; said first link having one end pivotally connected to one of said crank members at the pivot point thereon and having the other end thereof pivotally connected to said second link at said intermediate point thereon to provide for a vertical positioning of the rear bow which will position the rear bow forward and vertically of the forward end of the tonneau when the piston rod of said double acting power cylinder is retracted to permit unrestricted swinging movement of the tonneau as it moves between its open and closed positions.

9. In the power convertible assembly of claim 5, foldable linkage means having a first link thereon with a pin connected therethrough; means including lost motion means for connecting said pin to the vehicle body for pivotal movement of the foldable linkage means to assist raising and lowering the top with respect to the body; and guide linkage means for connecting said crank with respect to the foldable linkage means to cause said foldable linkage means to move in accordance with operation of said second pair of double acting power cylinder means whereby the top is raised and lowered in accordance with the sequence of movement of the tonneau and the rear bow.

10. In the power convertible assembly of claim 5, balance linkage means including a link fixedly connected to said crank to be moved therewith and positioned by said crank vertically of the vehicle body when the top is raised to provide a rear column support for the top when the top is in its raised position.

11. In the power convertible assembly of claim 1, hold down means for holding said rear bow in engagement with the vehicle body including coacting means on said rear bow and the vehicle body engageable as said rear bow approaches engagement with the body and operative to draw said rear bow toward the body and into sealed engagement therewith.

* * * * *